US012690040B2

(12) United States Patent
Takahashi et al.

(10) Patent No.: US 12,690,040 B2
(45) Date of Patent: Jul. 21, 2026

(54) TERMINAL, RADIO COMMUNICATION SYSTEM AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 324 days.

(21) Appl. No.: 18/559,729

(22) PCT Filed: May 10, 2021

(86) PCT No.: PCT/JP2021/017756
§ 371 (c)(1),
(2) Date: Nov. 8, 2023

(87) PCT Pub. No.: WO2022/239078
PCT Pub. Date: Nov. 17, 2022

(65) Prior Publication Data
US 2024/0236999 A1 Jul. 11, 2024

(51) Int. Cl.
*H04W 72/21* (2023.01)
*H04W 72/56* (2023.01)

(52) U.S. Cl.
CPC ........... *H04W 72/21* (2023.01); *H04W 72/56* (2023.01)

(58) Field of Classification Search
None
See application file for complete search history.

(56) References Cited

U.S. PATENT DOCUMENTS

2025/0097671 A1 * 3/2025 Li ......................... H04L 1/1812

OTHER PUBLICATIONS

3GPP TSG RAN Meeting #88e; RP-201310 "Revised WID: Enhanced Industrial Internet of Things (IoT) and ultra-reliable and low latency communication (URLLC) support for NR" Nokia, Nokia Shanghai Bell; Electronic meeting; Jun. 29-Jul. 3, 2020 (6 pages).
3GPP TSG RAN WG1 #104b-e; R1-2103327 "Intra-UE Multiplexing/Prioritization" ETRI; e-Meeting; Apr. 12-20, 2021 (7 pages).
3GPP TSG RAN WG1 #104b-e; R1-2102871 "Discussion on Intra-UE Multiplexing/Prioritization" Quectel, Langbo; e-Meeting; Apr. 12-20, 2021 (7 pages).
International Search Report issued in International Application No. PCT/JP2021/017756, mailed Nov. 22, 2021 (3 pages).
Written Opinion issued in International Application No. PCT/JP2021/017756; Dated Nov. 22, 2021 (3 pages).

(Continued)

*Primary Examiner* — Angela Nguyen
(74) *Attorney, Agent, or Firm* — Osha Bergman Watanabe & Burton LLP

(57) ABSTRACT

A terminal is disclosed including a control unit that is capable of multiplexing a first uplink control information of a first priority and a second uplink control information of a second priority in an uplink control channel; and a communication unit that transmits an uplink signal via the uplink control channel, wherein the control unit determines a resource of the uplink control channel based on whether the first uplink control information is associated with the first uplink control information.

4 Claims, 13 Drawing Sheets

(56)            References Cited

OTHER PUBLICATIONS

Office Action issued in Japanese Patent Application No. 2023-520597, issued Mar. 11, 2025 (6 pages).
Office Action issued in Japanese Patent Application No. 2023-520597, dated Jun. 24, 2025 (7 pages).
ETSI TS 138 213 V16.5.0 "5G; NR; Physical layer procedures for control (3GPP TS 38.213 version 16.5.0 Release 16)" Apr. 2021 (188 pages).
3GPP TSG RAN WG1 #104b-e; R1-2102395; OPPO; "Enhancements on intra-UE multiplexing/prioritization"; e-Meeting, Apr. 12-20, 2021 (6 pages).
3GPP TSG RAN WG1 #104b-e; R1-2102912; CMCC; "Discussion on intra-UE multiplexing/prioritization"; e-Meeting, Apr. 12-20, 2021 (10 pages).

* cited by examiner

FIG.2

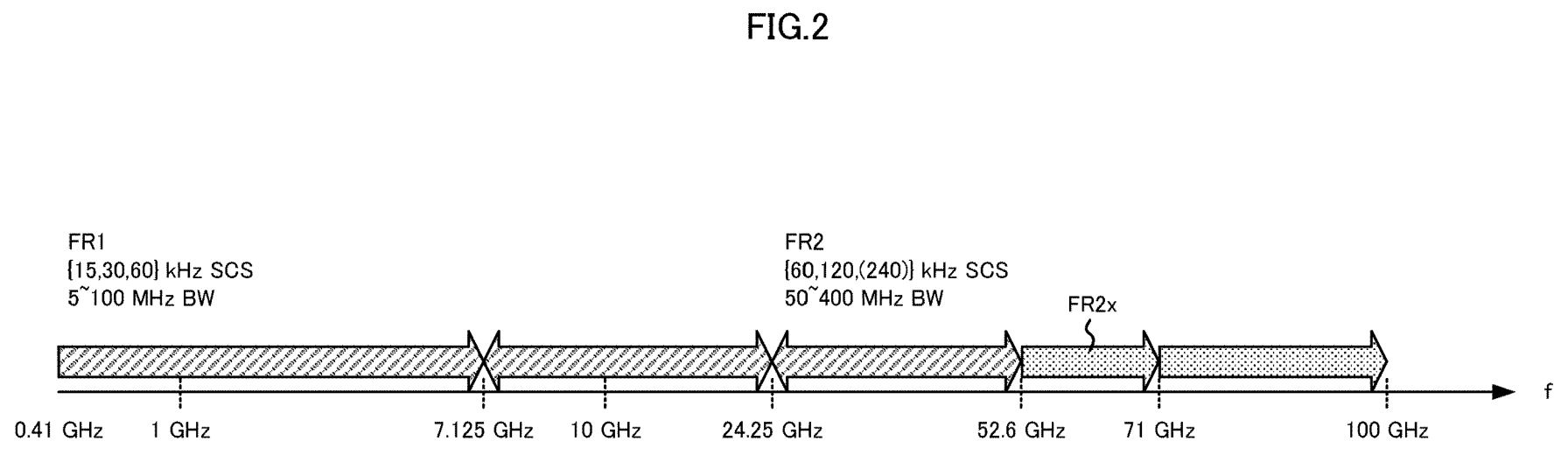

FR1
{15,30,60} kHz SCS
5~100 MHz BW

FR2
{60,120,(240)} kHz SCS
50~400 MHz BW

FR2x f 0.41 GHz    1 GHz    7.125 GHz    10 GHz    24.25 GHz    52.6 GHz    71 GHz    100 GHz

FIG.3

CSI Part 2

Channel coding

Rate Matching $E_{UCI}=N_L*Q'_{CSI-part2}*Q_m$

TERMINAL, RADIO COMMUNICATION SYSTEM AND RADIO COMMUNICATION METHOD

TECHNICAL FIELD

The present disclosure relates to a terminal, a radio communication system and a radio communication method for performing radio communication, in particular, a terminal, a radio communication system and a radio communication method related to multiplexing uplink control information for an uplink channel.

BACKGROUND ART

The 3rd Generation Partnership Project (3GPP) has specified the 5th generation mobile communication system (Also called 5G, New Radio (NR), or Next Generation (NG)) and is also in the process of specifying the next generation called Beyond 5G, 5G Evolution or 6G.

Release 15 of 3GPP supports simultaneous transmission of two or more uplink channels (PUCCH (Physical Uplink Control Channel) and PUSCH (Physical Uplink Shared Channel)) transmitted in the same slot.

In addition, Release 17 of 3GPP agreed to support multiplexing Uplink Control Information (UCI) with different priorities into PUCCH (For example, Non-Patent Literature 1).

CITATION LIST

Non-Patent Literature

[Non-Patent Literature 1]
   "Enhanced Industrial Internet of Things (IoT) and ultra-reliable and low latency communication," RP-201310, 3GPP TSG RAN Meeting #86e, 3GPP, July 2020

SUMMARY OF INVENTION

Against this background, the inventors, etc. identified the necessity of appropriately determining the resources of PUCCH when 2 or more UCIs are multiplexed in PUCCH.

Accordingly, the present invention has been made in view of this situation, and it is an object of the present invention to provide a terminal, a radio communication system, and a radio communication method that can multiplex two or more UCIs into appropriate PUCCH resources.

An aspect of the disclosure is a terminal comprising: a control unit that is capable of multiplexing a first uplink control information of a first priority and a second uplink control information of a second priority in an uplink control channel; and a communication unit that transmits an uplink signal via the uplink control channel; wherein the control unit determines a resource of the uplink control channel based on whether the first uplink control information is associated with the first uplink control information.

An aspect of the disclosure is a radio communication system comprising: a terminal; and a base station; wherein the terminal comprises: a control unit that is capable of multiplexing a first uplink control information of a first priority and a second uplink control information of a second priority in an uplink control channel; and a communication unit that transmits an uplink signal via the uplink control channel; wherein the control unit determines a resource of the uplink control channel based on whether the first uplink control information is associated with the first uplink control information.

An aspect of the disclosure is a radio communication method comprising: a step capable of multiplexing a first uplink control information of a first priority and a second uplink control information of a second priority in an uplink control channel; a step of transmitting an uplink signal via the uplink control channel: and a step of determining a resource of the uplink control channel based on whether the first uplink control information is associated with the first uplink control information.

BRIEF DESCRIPTION OF DRAWINGS

FIG. 2 shows a frequency range used in the radio communication system 10.

FIG. 3 shows a configuration example of a radio frame, a sub-frame and a slot used in the radio communication system 10.

MODES FOR CARRYING OUT THE INVENTION

Figure 1:
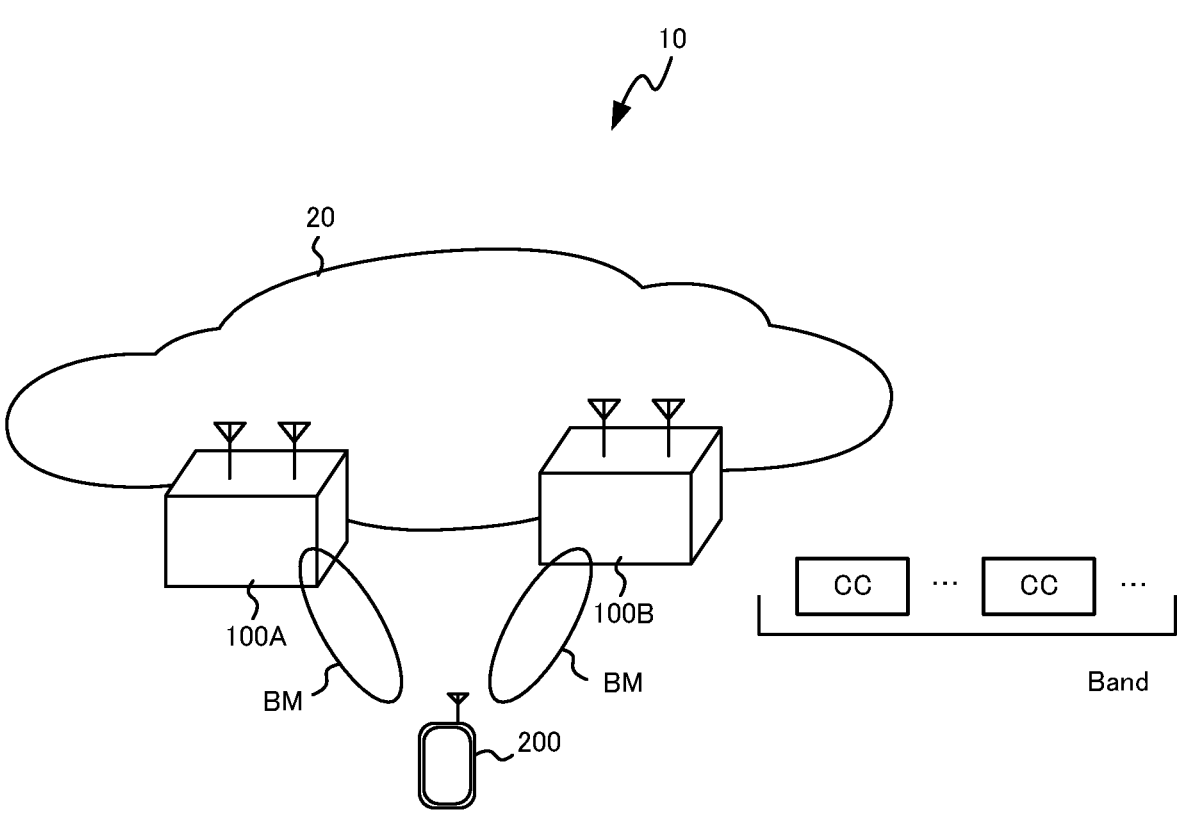
FIG. 1 is an overall schematic diagram of the radio communication system 10.

Exemplary embodiments of the present invention are explained below with reference to the accompanying drawings. The same functions and configurations are denoted by the same or similar reference numerals, and their descriptions are omitted accordingly.

Embodiments

(1) Overall Schematic Configuration of Radio Communication System

FIG. 1 is an overall schematic configuration diagram of a radio communication system 10 according to an embodiment. the radio communication system 10 is a radio communication system according to 5G New Radio (NR) and includes the Next Generation-Radio Access Network 20 (hereinafter NG-RAN20 and terminal 200 (UE200).

The radio communication system 10 may be a radio communication system according to a system called Beyond 5G, 5G Evolution or 6G.

The NG-RAN20 includes a radio base station 100 A (gNB100A) and a radio base station 100B (gNB100B0B). The specific configuration of the radio communication system 10 including the number of gNBs and UEs is not limited to the example shown in FIG. 1.

The NG-RAN20 actually includes a plurality of NG-RAN Nodes, specifically gNBs (or ng-eNBs), connected to a core network (5GC, not shown) according toto 5G. Note that the NG-RAN20 and 5GC may be referred to simply as "networks".

The gNB100A and gNB100B are radio base stations in accordance with 5G, and perform radio communications in accordance with the UE200 a and 5G. The gNB100A, gNB100B, and UE200 can support Massive MIMO (Multiple-Input Multiple-Output), which generates a more directional beam BM by controlling radio signals transmitted from multiple antenna elements; Carrier Aggregation (CA), which uses multiple component carriers (CCs) bundled together; and Dual Connectivity (DC), which communicates with two or more transport blocks simultaneously between the UE and each of two NG-RAN Nodes.

The radio communication system 10 also supports multiple frequency ranges (FRs). FIG. 2 shows the frequency ranges used in radio communication system 10.

As shown in FIG. 2, the radio communication system 10 corresponds to FR1 FR and FR2. The frequency bands of each FR are as follows.

FR1:410 MHz~7.125 GHz

FR2:24.25 GHz~52.6 GHz

FR1 uses 15, 30 or 60 kHz sub-carrier spacing (SCS) and may use a 5~100 MHz bandwidth (BW). FR2 is higher frequency than FR1 and may use 60 or 120 kHz (may include 240 kHz) SCS and may use a 50~400 MHz bandwidth (BW).

SCS may be interpreted teas numerology. Numerology is defined in 3GPP TS38.300 and corresponds to one subcarrier interval in the frequency domain.

In addition, the radio communication system 10 corresponds to a higher frequency band than the frequency band of FR2. Specifically, the radio communication system 10 corresponds to a frequency band exceeding 52.6 GHz and up to 71 GHz or 114.25 GHz. Such a high frequency band may be referred to as "FR 2×" for convenience.

In order to solve the problem that the influence of phase noise increases in the high frequency band, a cyclic prefix-orthogonal frequency division multiplexing (CP-OFDM)/discrete Fourier transform-spread (DFT-S-OFDM) with a larger sub-carrier spacing (SCS) may be applied when a band exceeding 52H.6 GHz is used.

Figure 3:
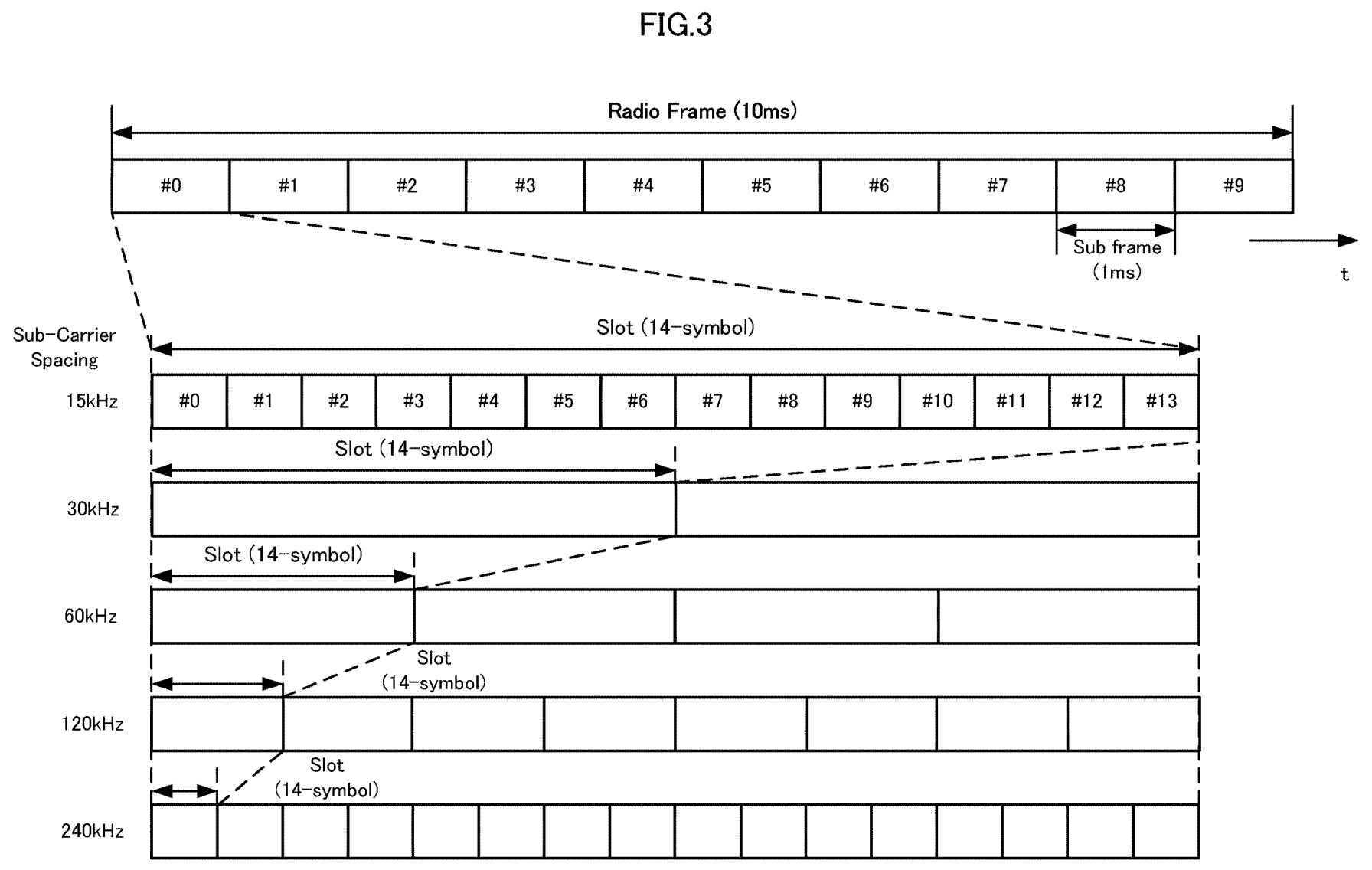

FIG. 3 shows a configuration example of a radio frame, a sub-frame and a slot used in the radio communication system 10.

As shown in FIG. 3, a slot consists of 14 symbols, and the larger (wider) the SCS, the shorter the symbol per period (and slot period). The SCS is not limited to the interval (frequency) shown in FIG. 3. For example, 480 kHz, 960 kHz, and the like may be used.

The number of symbols constituting 1 slot may not necessarily be 14 symbols (For example, 28, 56 symbols). Furthermore, the number of slots per subframe may vary depending on the SCS.

Note that the time direction (t) shown in FIG. 3 may be referred to as a time domain, symbol period, symbol time, etc. The frequency direction may be referred to as a frequency domain, resource block, subcarrier, bandwidth part (BWP), etc.

A DMRS is a type of reference signal and is prepared for various channels. In this context, unless otherwise specified, a DMRS for a downlink data channel, specifically a PDSCH (Physical Downlink Shared Channel), may be used. However, a DMRS for an uplink data channel, specifically a PUSCH (Physical Uplink Shared Channel), may be interpreted in the same way as a DMRS for a PDSCH.

The DMRS may be used for channel estimation in a device, e.g., UE200, as pas rt of a coherent demodulation. The DMRS may be present only in the resource block (RB) used for PDSCH transmission.

The DMRS may have more than one mapping type. Specifically, the DMRS may have a mapping type A and a mapping type B. In a mapping type A, the first DMRS is located in the second or third symbol of the slot. In a mapping type A, the DMRS may be mapped relative to the slot boundary regardless of where the actual data transmission is initiated in the slot. The reason why the first DMRS is placed in the second or third symbol of the slot may be interpreted as placing the first DMRS after the control resource sets (CORESET).

In mapping type B, the first DMRS may be placed in the first symbol of the data allocation. That is, the location of the DMRS may be given relative to where the data is located, rather thana relative to the slot boundary.

The DMRS may also have more than one type. Specifically, the DMRS may have Type 1 and Type 2. Type 1 and Type 2 differ in the maximum number of mapping and orthogonal reference signals in the frequency domain. Type 1 can output up to four orthogonal signals in single-symbol DMRS, and Type 2 can output up to eight orthogonal signals in double-symbol DMRS.

(2) Radio Communication System Functional Block Configuration

Next, a functional block configuration of the radio communication system 10 will be described.

First, a functional block configuration of the UE200 will be described.

Figure 4:
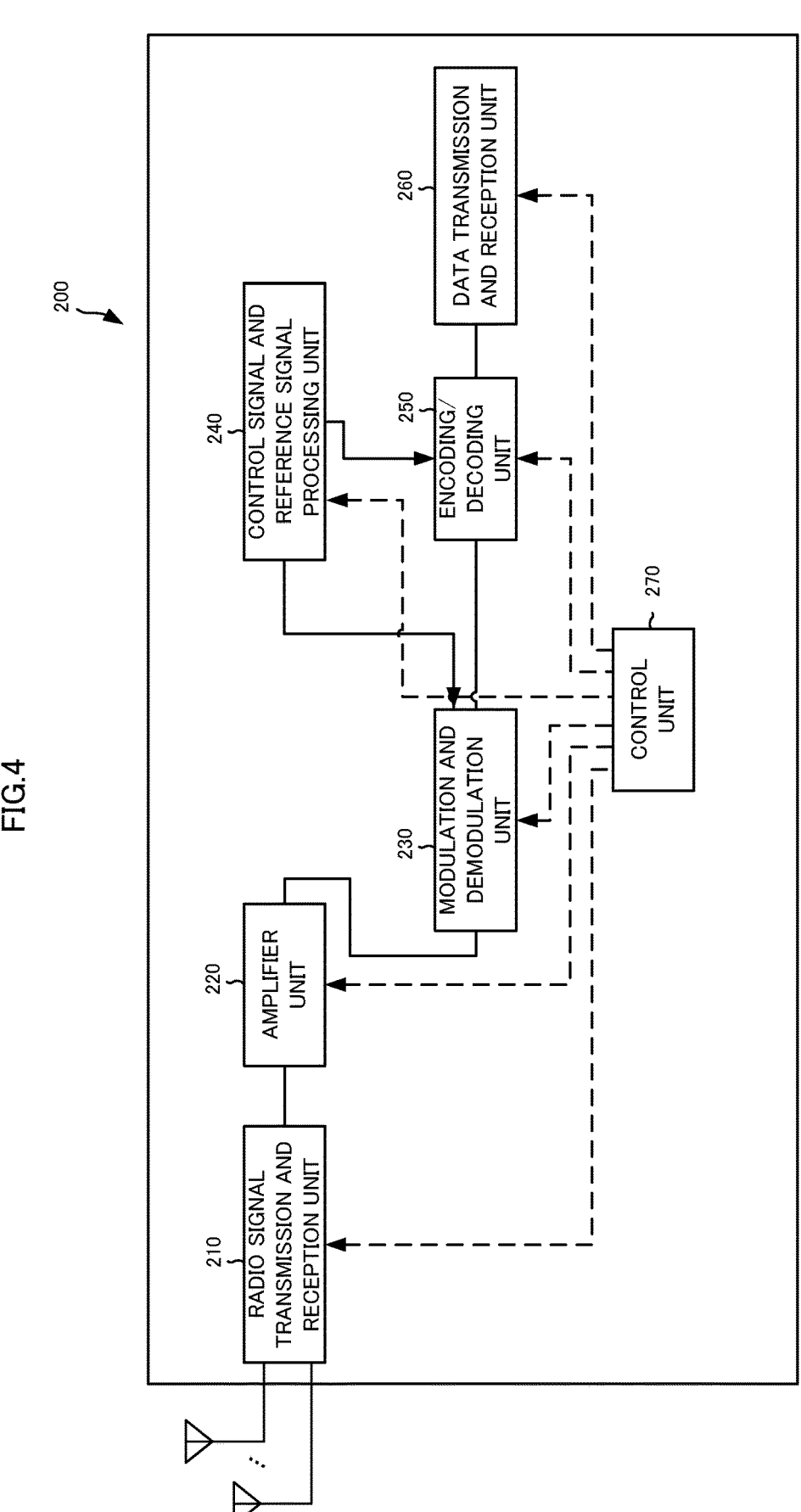
FIG. 4 shows a functional block configuration diagram of the UE200.

FIG. 4 is a functional block configuration diagram of the UE200. As shown in FIG. 4, the UE200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals in accordance with the NR. the radio signal transmission and reception unit 210 corresponds to a Massive MIMO, a CA using a plurality of CCs bundled together, and a DC that simultaneously communicates between a UE and each of two NG-RAN Nodes.

The amplifier unit 220 is composed of a PA (Power Amplifier)/LNA (Low Noise Amplifier) or the like. the amplifier unit 220 amplifies the signal output from the modulation and demodulation unit 230 to a predetermined power level. the amplifier unit 220 amplifies the RF signal output from the radio signal transmission and reception unit 210.

The modulation and demodulation unit 230 performs data modulation/demodulation, transmission power setting, resource block allocation, etc. for each predetermined communication destination (gNB100 or other gNB). In the modulation and demodulation unit 230, Cyclic Prefix-Orthogonal Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing related to various control signals transmitted and received by the UE200 and various reference signals transmitted and received by the UE200.

Specifically, the control signal and reference signal processing unit 240 receives various control signals transmitted from the gNB100 via a predetermined control channel, for example a radio resource control layer (RRC) control signal. the control signal and reference signal processing unit 240 also transmits various control signals to the gNB100 via a predetermined control channel.

The control signal and reference signal processing unit 240 executes processing using a reference signal (RS) such as a demodulation reference signals (DMRS) and a phase tracking reference signal (PTRS).

The DMRS is a known reference signal (pilot signal) between a base station and a terminal of each terminal for estimating a fading channel used for data demodulation. The PTRS is a reference signal of each terminal for estimating phase noise, which is a problem in a high frequency band.

In addition to the DMRS and the PTRS, the reference signal may include a Channel State Information-Reference Signal (CSI-RS), a Sounding Reference Signal (SRS), and a P positioning Reference Signal (PRS) for position information.

The channel may include a control channel and a data channel. The control channel may include PDCCH (Physical Downlink Control Channel), PUCCH (Physical Uplink Control Channel), RACH (Random Access Channel), Downlink Control Information (DCI) including Random Access Radio Network Temporary Identifier (RA-RNTI), and Physical Broadcast Channel (PBCH).

The data channel may also include PDSCH (Physical Downlink Shared Channel) and PUSCH (Physical Uplink Shared Channel). Data means data transmitted over a data channel. A data channel may be read as a shared channel.

Here, the control signal and reference signal processing unit 240 may receive downlink control information (DCI). The DCI includes existing fields for storing DCI Formats, Carrier indicator (CI), BWP indicator, Frequency Domain Resource Allocation (FDRA), Time Domain Resource Allocation (TDRA), Modulation and Coding Scheme (MCS), HPN (HARQ Process Number), New Data Indicator (NDI), Redundancy Version (RV), and the like.

The value stored in the DCI Format field is an information element that specifies the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by an information element (BandwidthPart-Config) contained in the RRC message. The value stored in the FDRA field is an information element that specifies the frequency domain resource to which the DCI applies. The frequency domain resource is specified by the value stored in the FDRA field and the information element (RA Type) contained in the RRC message. The value stored in the TDRA field is the information element that specifies the time domain resource to which the DCI is applied. The time domain resource is specified by the value stored in the TDRA field and the information element (pdsch-TimeDomainAllocationList, pusch-TimeDomainAllocationList) contained in the RRC message. The time domain resource may be specified by the value stored in the TDRA field and the default table. The value stored in the MCS field is an information element that specifies the MCS to which the DCI applies. The MCS is specified by the value stored in the MCS and the MCS table. The MCS table may be specified by an RRC message or identified by RNTI scrambling. The value stored in the HPN field is an information element that specifies the HARQ Process to which the DCI is applied. The value stored in the NDI is an information element that identifies whether the data to which the DCI is applied is first-time data. The value stored in the RV field is an information element that specifies the redundancy of the data to which the DCI is applied.

In an embodiment, the control signal and reference signal processing unit 240 constitutes a communication unit that transmits an uplink signal via an uplink control channel (PUCCH).

The encoding/decoding unit 250 performs data division/concatenation and channel coding/decoding for each predetermined communication destination (gNB100 or other gNB).

Specifically, the encoding/decoding unit 250 divides the data output from the data transmission and reception unit 260 into predetermined sizes and performs channel coding for the divided data. the encoding/decoding unit 250 decodes the data output from the modulation and demodulation unit 230 and concatenates the decoded data.

The data transmission and reception unit 260 transmits and receives the protocol data unit (PDU) and the service data unit (SDU). Specifically, the data transmission and reception unit 260 performs assembly/disassembly of the PDU/SDU in a plurality of layers (Media access control layer (MAC), radio link control layer (RLC), packet data convergence protocol layer (PDCP), etc.). the data transmission and reception unit 260 also performs error correction and retransmission control of data based on HARQ (Hybrid Automatic Repeat Request).

The control unit 270 controls each function block constituting the UE200. In the embodiment, the control unit 270 constitutes a control unit that can multiplex the first uplink control information (first UCI) of the first priority and the second uplink control information (second UCI) of the second priority into the uplink control channel (PUCCH).

Here, the first priority and the second priority may be assumed as the priority of the UCI. The first priority may be different from the second priority. For example, two types of UCI priorities, HP (High Priority) and LP (Low Priority), are illustrated. For example, the first priority may be HP and the second priority may be LP. The first UCI may be referred to as HP UCI and the second UCI may be referred to as LP UCI. However, three or more types of priority may be specified as UCI priority.

Under such a premise, the control unit 270 determines the resource of the uplink control channel (PUCCH) based on whether or not the first downlink control information (first DCI) is associated with the first UCI (HP UCI).

"The first DCI is associated with the HP UCI" means that the HP UCI is transmitted using the resource specified by the first DCI from among the resources that can be specified by the first DCI when the HP UCI is assumed not to be multiplexed with the LP UCI. For example, the resource that can be specified by the first DCI may be a PUCCH resource configured for the HP UCI by an information element (For example, PUCCH-ResourceSet(s)) contained in an RRC message (For example, PUCCH-Config).

"No first DCI associated with the HP UCI" means that if the HP UCI is not assumed to be multiplexed with the LP UCI, the HP UCI is transmitted using a resource configured as a resource other than the resource that can be specified by the first DCI. For example, a resource configured as a resource other than the resource that can be specified by the first DCI may be a PUCCH resource configured for the HP UCI by an information element (For example, SPS (Semi- Persistent Scheduling)-PUCCH-AN-List) contained in an RRC message (For example, PUCCH-Config).

The UCI may include an acknowledgment (HARQ-ACK) for one or more TBs. The UCI may include a scheduling request (SR) requesting scheduling of a resource and a channel state information (CSI) representing the state of the channel.

Note that the control unit 270 controls the control signal and reference signal processing unit 240 described above, and the control signal and reference signal processing unit 240 may comprise a communication unit for transmitting an uplink signal via a PUSCH in which the UCI is multiplexed.

Second, a functional block configuration of the gNB100 will be described.

Figure 5:
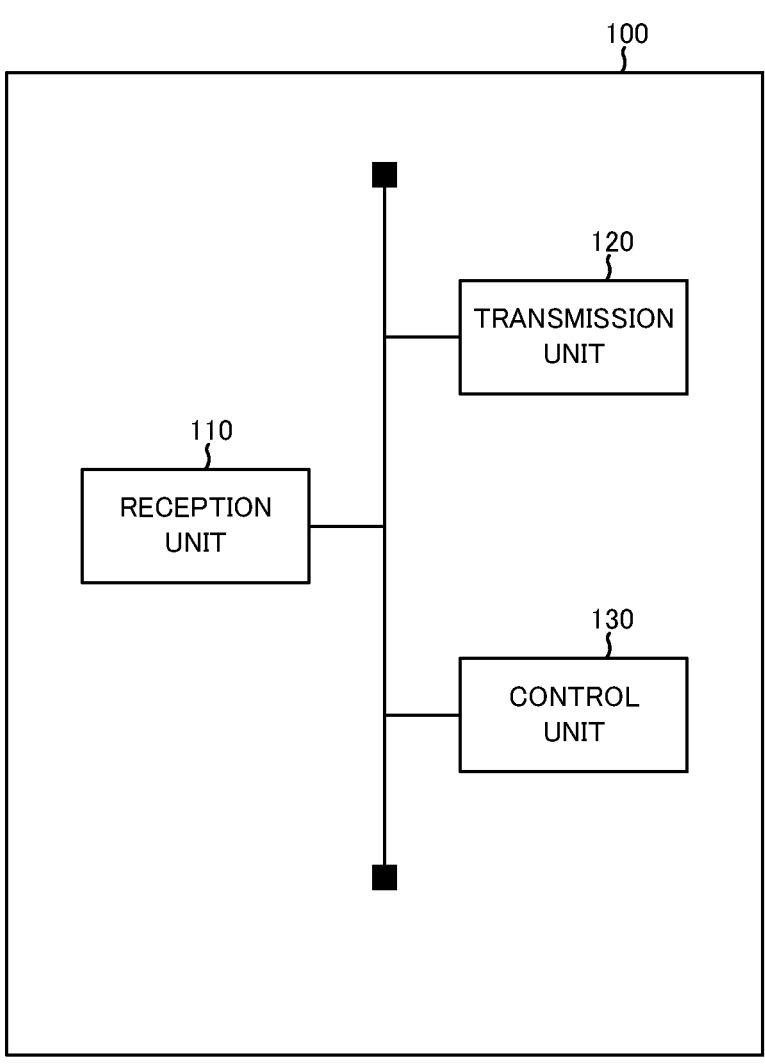
FIG. 5 shows a functional block configuration diagram of the gNB100.

FIG. 5 is a functional block diagram of the gNB100. As shown in FIG. 5, the gNB100 has a reception unit 110, a transmission unit 120, and a control unit 130.

The reception unit 110 receives various signals from the UE200. The reception unit 110 may receive UL signals via PUCCH or PUSCH.

The transmission unit 120 transmits various signals to the UE200. transmission unit 120 may transmit DL signals via PDCCH or PDSCH. In embodiments, the transmission unit 120 constitutes a communication unit that transmits to the UE200 an information element that explicitly or implicitly indicates at least one of the enabling and disabling of the multiplexing of the second priority UCI over the first priority PUSCH.

The control unit 130 controls the gNB100. The control unit 130 may assume that the resource of the uplink control channel (PUCCH) is determined based on whether or not the first downlink control information (first DCI) is associated with the first UCI (HP UCI).

(3) Rate Matching

Rate matching will be described below. Specifically, rate matching of UCI in the case where UCI is multiplexed on UL SCH will be described. HARQ-ACK, CSI Unit 1, and CSI Unit 2 will be exemplified as UCI. Note that HARQ-ACK, CSI-Unit 1, and CSI-Unit 2 are executed separately.

Figure 6:
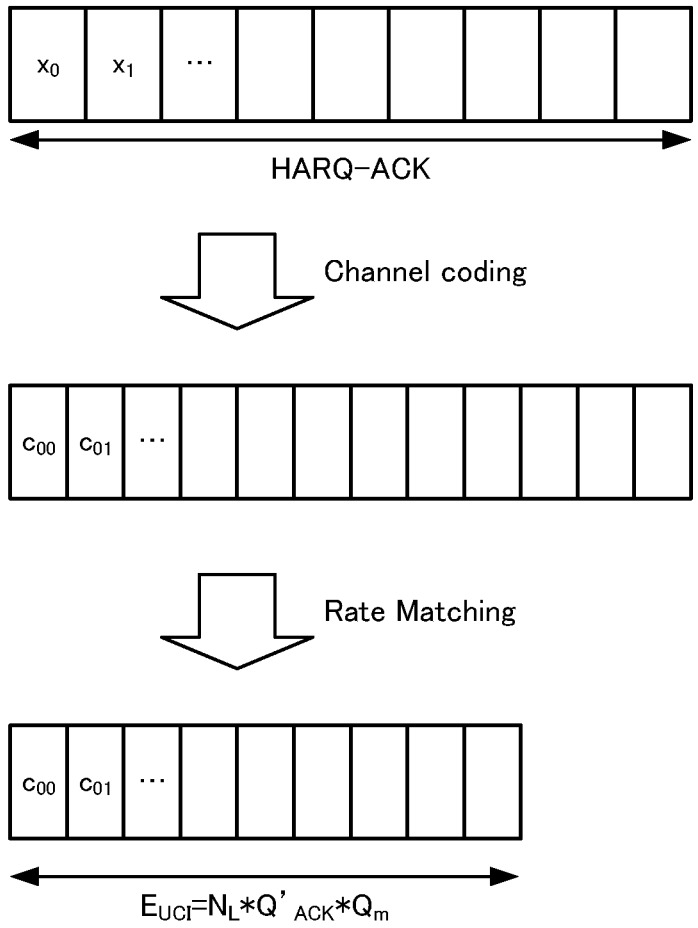
FIG. 6 shows a diagram for explaining rate matching.

As shown in FIG. 6, channel coding is applied to the HARQ-ACK having bit sequences of "$X_0, X_1, \ldots$" to obtain bit sequences of "C00, C01, ...". Rate matching is applied to such bit sequences. The bit sequence ($E_{UCI}$) after rate matching may be represented by $E_{UCI} = N_L \times Q'_{AC} \times Q_m$.

$N_L$ is the number of transmit layers of the PUSCH. $Q_m$ is the modulation condition of the PUSCH. For example, $Q'_{ACK}$ is expressed by the following equation (TS38.212 V 16.3.0 § 6.3.2.4.1.1 "HARQ-ACK"):

$$\beta_{offset}^{PUSCH}$$

is $$\beta_{offset}^{HARQ-ACK},$$

and $$\beta_{offset}^{HARQ-ACK}$$

is an example of the coefficient ($\beta$) multiplied to the number of bits constituting HARQ-ACK.

$$M_{sc}^{UCI}$$

is a bandwidth scheduled for PUSCH transmission, and is expressed by the number of subcarriers.

$C_{UL-SCH}$ is the number of code blocks for UL-SCH of PUSCH transmission.

$\alpha$ is an example of the scaling factor multiplied to the radio resource (here, $$M_{sc}^{UCI}$$

(l)) which can be used for the transmission of UCI.

Note that $Q'_{ACK}$ is the minimum value of the item defined by the coefficient ($\beta$) (left side) and the item defined by the scaling factor ($\alpha$) (right side). Therefore, it should be noted that the RE (Resource Element) used to transmit the HARQ-ACK may be limited by the scaling factor ($\alpha$).

Figure 7:
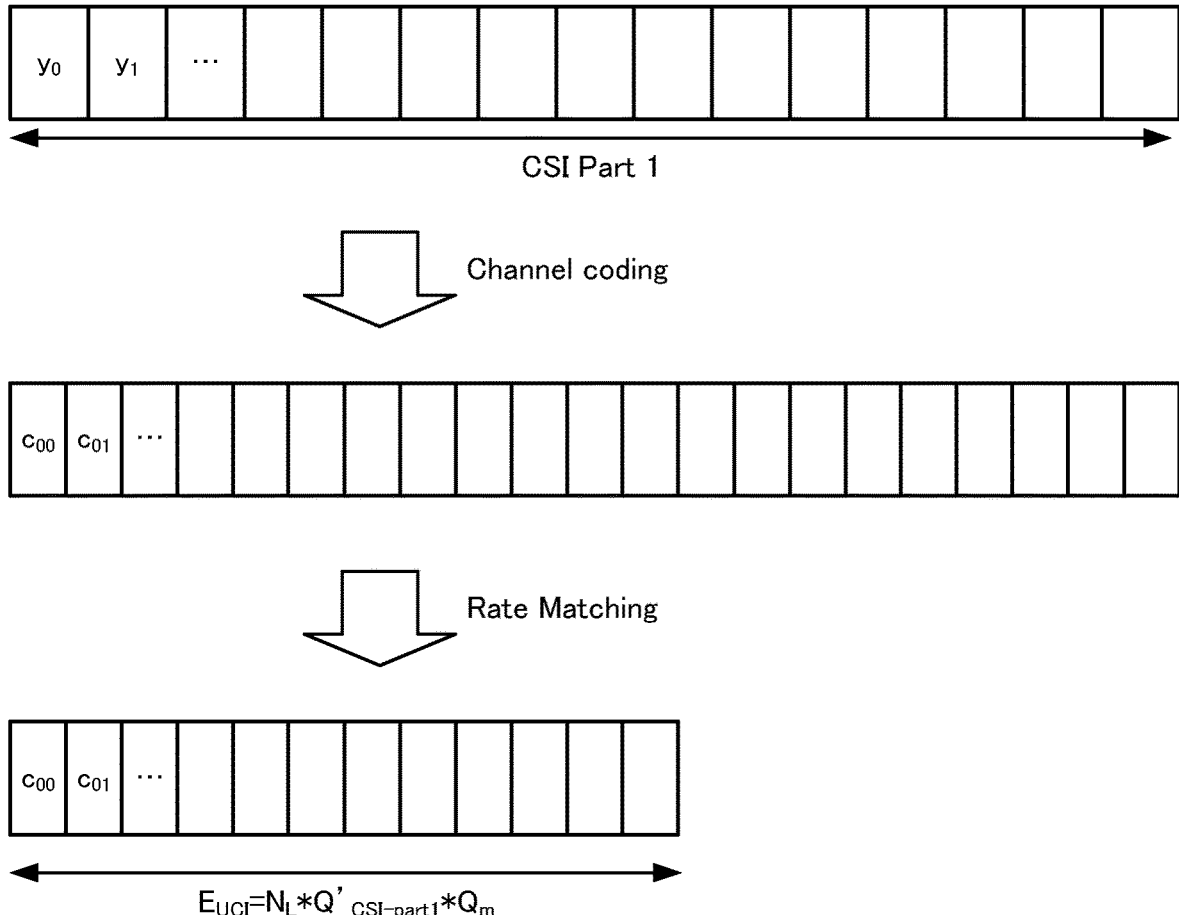
FIG. 7 shows a diagram for explaining rate matching.

As shown in FIG. 7, the bit sequences of "C00, C01, ..." are obtained by applying channel coding to CSI Unit 1 having the bit sequences of "$Y_0, Y_1, \ldots$". Rate matching is applied to such bit sequences. The bit sequence ($E_{UCI}$) after rate matching may be represented by $E_{UCI} = N_L \times Q'_{CSI-part1} \times Q_m$.

$N_L$ is the number of transmit layers of the PUSCH. $Q_m$ is the modulation condition of the PUSCH. For example, $Q'_{CSI-part1}$ is expressed by the following equation (TS38.212 V 16.3.0 § 6.3.2.4.1.2 "CSI part1").

[Equation 1]

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil \right\}$$

[Equation 2]

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CGI-UCI} \right\}$$

$O_{ACK}$ is the number of bits of HARQ-ACK.
$L_{ACK}$ is the number of bits of CRC applied for HARQ-ACK.

$O_{CSI-1}$ is the number of bits of CSI Part 1.
$L_{CSI-1}$ is the number of bits of CRC applied for CSI Part 1.

$$\beta_{offset}^{PUSCH}$$

is $$\beta_{offset}^{CSI-part1},$$

and $$\beta_{offset}^{CSI-part1}$$

is an example of the coefficient (β) multiplied to the number of bits constituting CSI Part 1.

$$M_{sc}^{UCI}$$

(l) is a bandwidth scheduled for PUSCH transmission, and is expressed by the number of subcarriers.

$C_{UL-SCH}$ is the number of code blocks for UL-SCH of PUSCH transmission.

α is an example of the scaling factor multiplied to the radio resource (here, $$M_{sc}^{UCI}$$

(l)) which can be used for the transmission of UCI.

Note that $Q'_{ACK}$ is the minimum value of the item defined by the coefficient (β) (left side) and the item defined by the scaling factor (α) (right side). Therefore, it should be noted that the RE (Resource Element) used to transmit CSI Unit 1 may be limited by the scaling factor (α).

Figure 8:
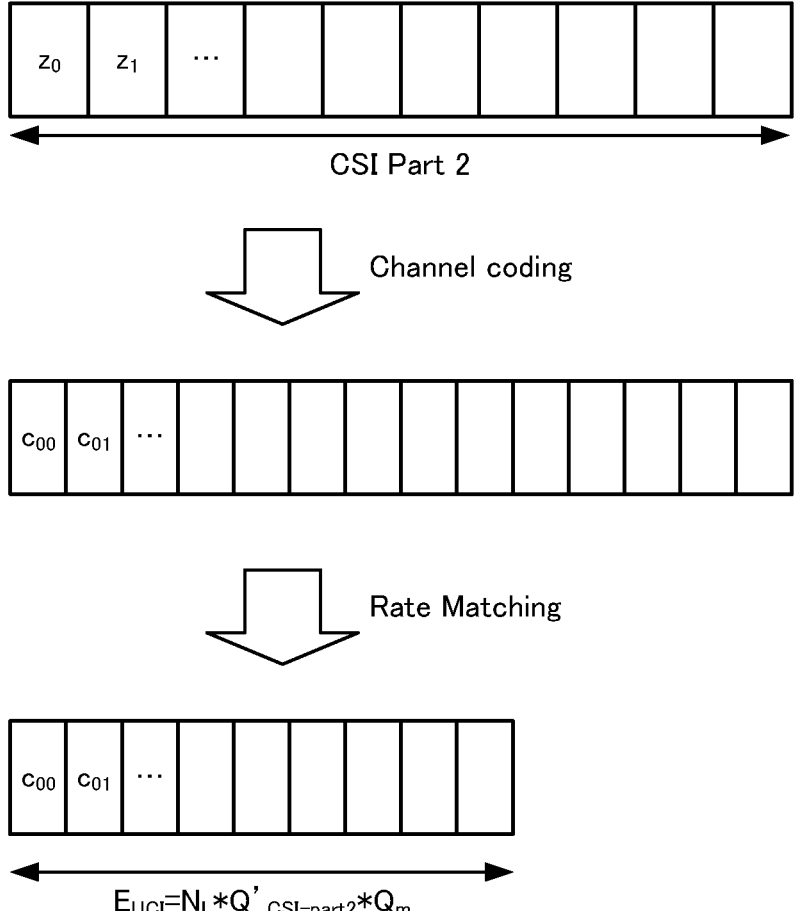
FIG. 8 shows a diagram for explaining rate matching.

As shown in FIG. 8, the bit sequences "C00, C01, . . . " are obtained by applying channel coding to CSI Unit 2 having the bit sequences "$Z_0$, $Z_1$, . . . ". Rate matching is applied to such bit sequences. The bit sequence ($E_{UCI}$) after rate matching may be represented by $E_{UCI}=N_L \times Q'_{CSI-part2} \times Q_m$.

$N_L$ is the number of transmit layers in PUSCH. $Q_m$ is the modulation condition of PUSCH. For example, $Q'_{CSI-part2}$ is expressed by the following equation (TS38.212 V 16.3.0 § 6.3.2.4.1.3 "CSI part2").

[Equation 3]

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CGI-UCI} - Q'_{CSI-1} \right\}$$

$O_{CSI-2}$ is the number of bits of CSI Part 2.
$L_{CSI-2}$ is the number of bits of CRC applied for CSI Part 2.

$$\beta_{offset}^{PUSCH}$$

is $$\beta_{offset}^{CSI-part2},$$

and $$\beta_{offset}^{CSI-part2}$$

is an example of the coefficient (β) multiplied to the number of bits constituting CSI Part 2.

$$M_{sc}^{UCI}$$

(l) is a bandwidth scheduled for PUSCH transmission, and is expressed by the number of subcarriers.

$C_{UL-SCH}$ is the number of code blocks for UL-SCH of PUSCH transmission.

α is an example of the scaling factor multiplied to the radio resource (here, $$M_{sc}^{UCI}$$

(l)) which can be used for the transmission of UCI.

Note that $Q'_{ACK}$ is the minimum value of the item defined by the coefficient (β) (left side) and the item defined by the scaling factor (α) (right side). Therefore, it should be noted that the RE (Resource Element) used to transmit CSI Unit 2 may be limited by the scaling factor (α).

(4) Operation Example

An operation example of the embodiment will be described below. A method for determining the resources (PUCCH resource) of the PUCCH will be described below when the HP UCI and the LP UCI can be multiplexed into the PUCCH. As described above, the UE200 determines the PUCCH resources based on whether the HP UCI has a first DCI associated with it.

The details of how the PUCCH resources are determined are described below.

(4.1) Operation Example 1

The following describes an operation example 1. In the operation example 1, a case in which the first DCI is associated with the HP UCI will be described.

Figure 9:
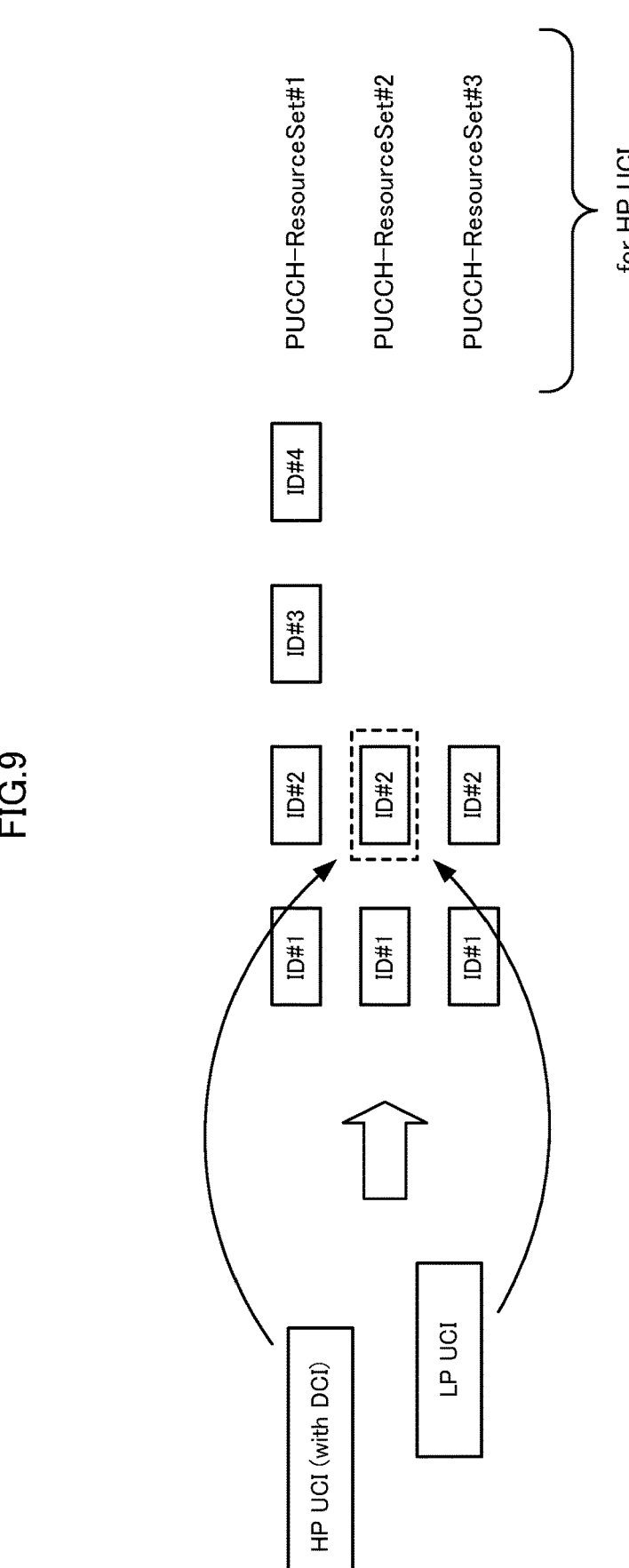
FIG. 9 shows a diagram for explaining an operation example 1.

As shown in FIG. 9, when the first DCI is associated with the HP UCI, the UE200 determines the PUCCH resource (Multiplexed PUCCH resource) that multiplexes the HP UCI and the LP UCI from among the resources that can be specified by the first DCI. The resource that may be specified by the first DCI is the PUCCH resource set for HP UCI by the information element (PUCCH-ResourceSet(s)) contained in the RRC message (For example, PUCCH-Config). The first DCI contains the information element (PUCCH Resource Indicator) that specifies the PUCCH resource from the PUCCH resource set by the PUCCH-ResourceSet(s).

FIG. 9 illustrates a case where the PUCCH resource specified by ID #2 included in the PUCCH-ResourceSet #2 is determined as a multiplexed PUCCH resource.

Here, the multiplexed PUCCH resource may be determined based on the following options:

For example, the multiplexed PUCCH resource may be determined based on the PUCCH Resource Indicator. The following options may be used to identify the PUCCH Resource Indicator:

In option 1, the PUCCH Resource Indicator specifying the Multiplexed PUCCH resource may be the PUCCH Resource Indicator included in the most recent first DCI among the first DCIs associated with the HP UCI.

In option 2, the PUCCH Resource Indicator specifying the Multiplexed PUCCH resource may be the PUCCH Resource Indicator included in the most recent DCI among the first DCI associated with the HP UCI and the second DCI associated with the LP UCI when the second DCI associated with the LP UCI has been notified.

In option 3, the PUCCH Resource Indicator specifying the Multiplexed PUCCH resource may be the PUCCH Resource Indicator included in the DCI enabling the multiplexing of the HP UCI and the LP UCI when the DCI enabling the multiplexing of the HP UCI and the LP UCI is defined.

In option 4, the PUCCH Resource Indicator specifying the Multiplexed PUCCH resource may be determined based on the upper layer settings. The upper layer settings may include RRC settings configured by RRC messages and may be configured using MAC CE messages.

In option 5, the PUCCH Resource Indicator specifying the Multiplexed PUCCH resource may be predetermined in the radio communication system 10. For example, it may be defined to use "0" as the PUCCH Resource Indicator.

Alternatively, the Multiplexed PUCCH resource may be determined based on specific conditions. The specific conditions may be conditions that select the PUCCH resource with the lowest delay in the PUCCH-ResourceSet(s) configured for HP UCI. The specific conditions may be conditions that select the PUCCH resource with the lowest target code rate in the PUCCH-ResourceSet(s) configured for HP UCI.

(4.2) Operation Example 2

The following describes an operation example 2. In the operation example 2, a case in which the first DCI is not associated with the HP UCI will be described. As the operation example 2, any one of the following examples may be employed.

(4.2.1) Operation Example 2-1

Figure 10:
FIG. 10 shows a diagram for explaining an operation example 2-1.
Figure 10:
Figure 10:
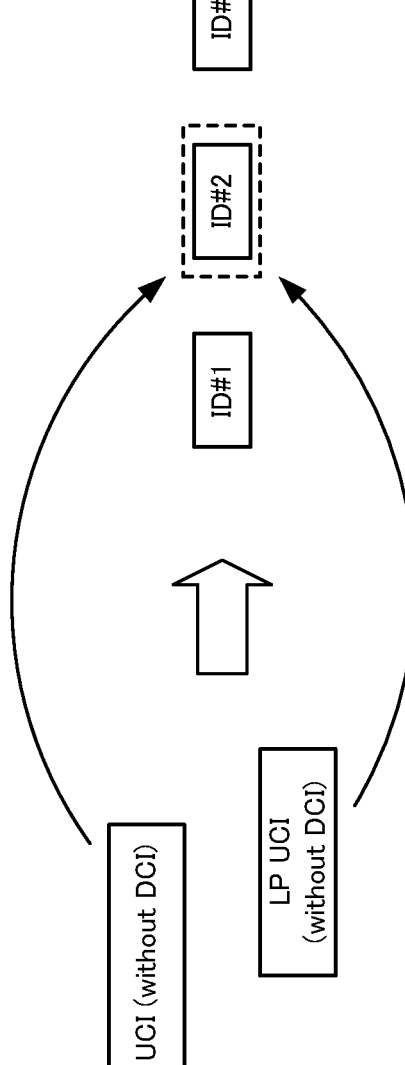

As shown in FIG. 10, the UE 200 determines a multiplexed PUCCH resource that multiplexes HP UCI and LP UCI from among resources set as resources other than those that can be designated by the first DCI. A resource set as a resource other than those that can be designated by the first DCI is a resource that is not designated as dynamic by the first DCI, and may be a resource that is set statically or quasi-persistently. For example, a resource set as a resource other than those that can be designated by the first DCI may be a PUCCH resource set for HP UCI by an information element (For example, SPS-PUCCH-AN-List) contained in an RRC message (For example, PUCCH-Config).

FIG. 10 illustrates a case where a PUCCH resource specified by ID #2 contained in the SPS-PUCCH-AN-List is determined as a multiplexed PUCCH resource.

(4.2.2) Operation Example 2-2

Figure 11:
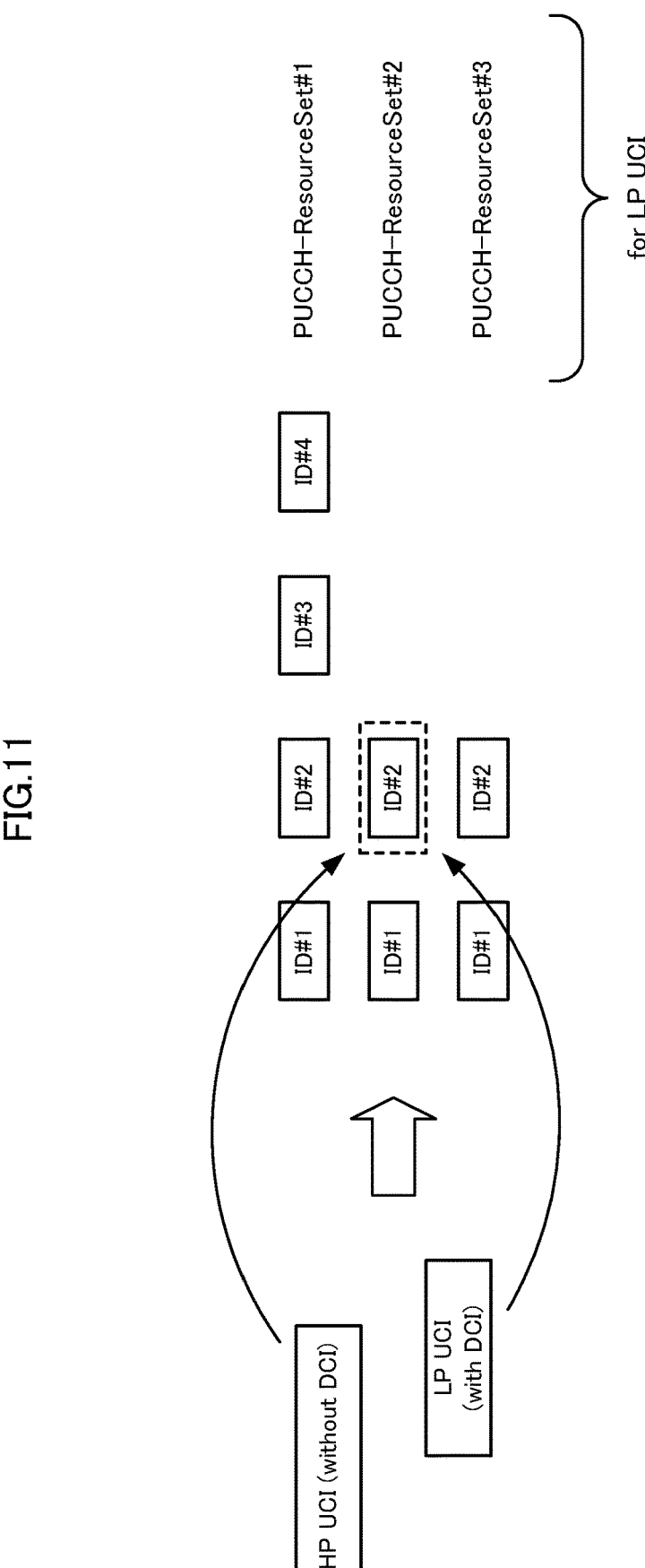
FIG. 11 shows a diagram for explaining an operation example 2-2.

As shown in FIG. 11, when the second DCI is associated with the LP UCI, the UE 200 determines a PUCCH resource that multiplexes the HP UCI and the LP UCI from among the resources that can be specified by the second DCI. The resource that may be specified by the second DCI is the PUCCH resource set for the LP UCI by the information element (PUCCH-ResourceSet(s)) contained in the RRC message (For example, PUCCH-Config). The second DCI contains the information element (PUCCH Resource Indicator) that specifies the PUCCH resource from the PUCCH resource set by the PUCCH-ResourceSet(s).

FIG. 11 illustrates a case where the PUCCH resource specified by ID #2 included in PUCCH-ResourceSet #2 is determined as a multiplexed PUCCH resource.

Here, the multiplexed PUCCH resource may be determined based on the following options:

For example, the multiplexed PUCCH resource may be determined based on the PUCCH Resource Indicator. The following options may be used to identify the PUCCH Resource Indicator:

In option 1, the PUCCH Resource Indicator specifying the Multiplexed PUCCH resource may be the PUCCH Resource Indicator included in the most recent second DCI among the second DCIs associated with the LP UCI.

In option 2, the PUCCH Resource Indicator specifying the Multiplexed PUCCH resource may be the PUCCH Resource Indicator included in the DCI enabling the Multiplexing of HP UCI and LP UCI when a DCI enabling the Multiplexing of HP UCI and LP UCI is defined.

In option 3, the PUCCH Resource Indicator specifying the Multiplexed PUCCH resource may be determined based on the upper layer settings. The upper layer settings may include RRC settings configured by RRC messages and may be configured using MAC CE messages.

In option 4, the PUCCH Resource Indicator specifying the Multiplexed PUCCH resource may be predetermined in the radio communication system 10. For example, it may be defined to use "0" as the PUCCH Resource Indicator.

Alternatively, the Multiplexed PUCCH resource may be determined based on specific conditions. The specific conditions may be conditions that select the PUCCH resource with the lowest delay in the PUCCH-ResourceSet(s) configured for the LP UCI. The specific conditions may be conditions that select the PUCCH resource with the lowest target code rate in the PUCCH-ResourceSet(s) configured for the LP UCI.

(4.2.3) Operation Example 2-3

Figure 12:
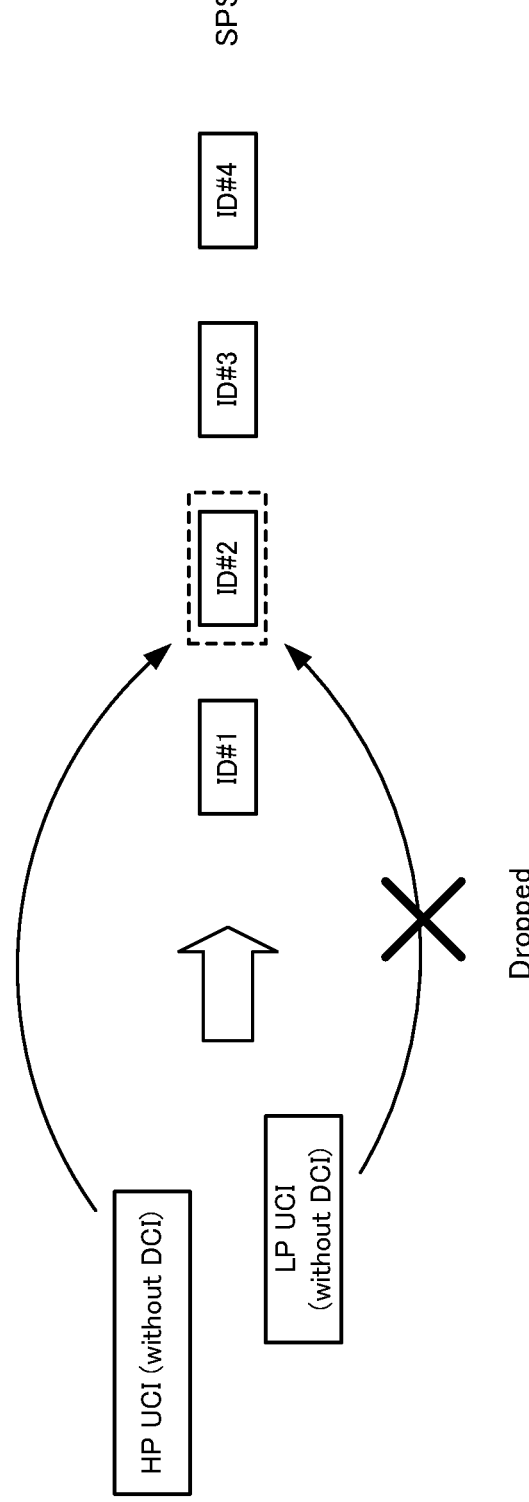
FIG. 12 is a diagram for explaining an operation example 2-3.

As shown in FIG. 12, the UE 200 drops the LP UCI. That is, the UE 200 transmits only the HP UCI without multiplexing the HP UCI with the LP UCI. Here, the UE 200 may determine the PUCCH resource to be used for transmitting the HP UCI from among the PUCCH resources set for the HP UCI by the information element (For example, SPS-PUCCH-AN-List) contained in the RRC message (For example, PUCCH-Config).

(5) Operational Effects

In an embodiment, the UE 200 determines a Multiplexed PUCCH resource based on whether the HP UCI has a first DCI associated with it. With such a configuration, the Multiplexed PUCCH resource can be appropriately determined because the method for determining the Multiplexed PUCCH resource is clarified when a case in which 2 or more UCIs are multiplexed on the PUCCH is assumed.

For example, as described in operation example 1, when the first DCI is associated with the HP UCI, the UE200 may determine the Multiplexed PUCCH resource that multiplexes the HP UCI and the LP UCI from among the resources that can be specified by the first DCI. With this configuration, the PUCCH resource that can be specified as dynamic is determined as the Multiplexed PUCCH resource, and thus the PUCCH resource that appropriately reflects the status of the NG RAN20 can be utilized.

Alternatively, as described in operation example 2-1, the UE200 may determine the PUCCH resource that multiplexes the HP UCI and the LP UCI (Multiplexed PUCCH resource) from among the resources that are semi-statically set as the PUCCH resource for the HP UCI when the first DCI is not associated with the HP UCI. With such a configuration, since the PUCCH resource for the HP UCI is used, at least the HP UCI can be appropriately transmitted when the HP UCI and the LP UCI are multiplexed.

Alternatively, as described in operation example 2-2, the UE200 may determine the PUCCH resource (Multiplexed PUCCH resource) that multiplexes the HP UCI and the LP UCI from among the resources that can be specified by the second DCI when the HP UCI is not associated with the first DCI and the LP UCI is associated with the second DCI. According to such a configuration, since the PUCCH resource that can be designated as dynamic is determined as the multiplexed PUCCH resource, the PUCCH resource that appropriately reflects the status of NG RAN20 can be utilized.

(6) APPENDIX

Although not particularly limited, the effective payload size of HP UCI and LP UCI may be determined by the coding rate. The coding rate may be determined by the following options:

(6.1) Option 1

The option 1 will be described below. The option 1 will describe a specific parameter (omega_LP_HP) applied to one of LP UCI and HP UCI. Here, omega_LP_HP is applied to LP UCI.

The coding rate of the HP UCI (HP_UCI_coding_rate) may be the coding rate applied to the HP UCI or the coding rate applied to the HP (High Priority) PUCCH resource. These coding rates are the coding rates before omega_LP_HP is multiplied and may be the original coding rate used in cases where UCIs with different priorities are not multiplexed.

The coding rate of the LP UCI (LP_UCI_coding_rate) may be the coding rate obtained by multiplying HP_UCI_coding_rate by omega_LP_HP.

(6.2) Option 2

The option 2 will be described below. The option 2 will describe a specific parameter (omega_LP_HP) applied to either LP UCI or HP UCI. Here, it is applied to omega_LP_HP for HP UCI.

The HP UCI coding rate (HP_UCI_coding_rate) may be the coding rate of LP_UCI_coding_rate divided by omega_

LP_HP. In other words, HP_UCI_coding_rate may be the coding rate of LP_UCI_coding_rate multiplied by the inverse of omega_LP_HP.

The coding rate of the LP UCI (LP_UCI_coding_rate) may be the coding rate applied to the LP UCI or the coding rate applied to the LP (Low Priority) PUCCH resource. These coding rates may be the coding rate before omega_LP_HP is multiplied and the original coding rate used in the case where UCIs with different priorities are not multiplexed.

(6.3) Option 3

The option 3 will be described below. The option 3 will describe a specific parameter (omega_LP_HP) applied to either LP UCI or HP UCI. Here, in the option 3, a case in which the format of PUCCH is one of PUCCH Format 2, PUCCH Format 3 and PUCCH Format 4 will be described. In the option 3, a case in which LP_UCI_coding_rate can be changed without changing HP_UCI_coding_rate will be described.

The coding rate of the HP UCI (HP_UCI_coding_rate) may be the coding rate applied to the HP UCI or the coding rate applied to the HP (High Priority) PUCCH resource. These coding rates are the coding rates before omega_LP_HP is multiplied and may be referred to as the original coding rate.

The coding rate of LP UCI (LP_UCI_coding_rate) may be expressed as LP_UCI_coding_rate=min (omega_LP_HP*HP_UCI_coding_rate, Upper_bound_LP_UCI_coding_rate).

Upper_bound_LP_UCI_coding_rate represents the upper limit of the coding rate of LP UCI, which is calculated based on the total number of Resource Elements (REs) in the PUCCH resource where LP_UCI is multiplexed, HP_UCI_coding_rate, HP UCI payload, and LP UCI payload. The LP UCI payload may be a payload where bits of LP UCI are not banded or partially dropped, or a payload where bits of LP UCI are banded or partially dropped.

(6.4) Option 4

The option 4 will be described below. The option 4 will describe a specific parameter (omega_LP_HP) applied to either LP UCI or HP UCI. A case in which the format of PUCCH is one of PUCCH Format 2, PUCCH Format 3, or PUCCH Format 4 will be described here. The option 4 will describe a case in which both LP_UCI_coding_rate and HP_UCI_coding_rate can be changed.

The HP UCI coding rate (HP_UCI_coding_rate) and LP UCI coding rate (LP_UCI_coding_rate) may be calculated based on the total number of REs, HP UCI payload, and LP UCI payload of the PUCCH resource in which the LP UCI and HP UCI are multiplexed. The LP UCI payload may be a payload in which bits of the LP UCI are not banded or partially dropped, or a payload in which bits of the LP UCI are banded or partially dropped.

However, the restriction condition that LP_UCI_coding_rate is the coding rate obtained by multiplying HP_UCI_coding_rate by omega_LP_HP may be imposed.

(6.5) Option 5

The option 5 will be described below. The option 5 will describe a case where a specific parameter applied to the LP UCI (omega_LP) and a specific parameter applied to the HP UCI (omega_HP) are defined separately. The option 5 will illustrate a case where omega_HP is provided without providing omega_LP.

The coding rate of the HP UCI (HP_UCI_coding_rate) may be the coding rate obtained by multiplying the original coding rate by omega_HP. The original coding rate may be the coding rate applied to the HP UCI or the coding rate applied to the HP PUCCH resource.

The LP UCI coding rate (LP_UCI_coding_rate) may be expressed by LP_UCI_coding_rate=min (HP_UCI_coding_rate, original coding rate). The original coding rate may be the coding rate applied to the LP UCI or the coding rate applied to the LP PUCCH resource.

(6.6) Option 6

The option 6 will be described below. The option 6 will describe a case where a specific parameter (omega_LP) applied to the LP UCI and a specific parameter (omega_HP) applied to the HP UCI are defined separately. The option 5 will illustrate a case where omega_LP is provided without providing omega_HP.

The HP UCI coding rate (HP_UCI_coding_rate) may be the coding rate applied to the HP UCI or the coding rate applied to the HP PUCCH resource. These coding rates may be referred to as the original coding rate.

The coding rate of the LP UCI (LP_UCI_coding_rate) may be the coding rate obtained by multiplying the original coding rate by omega_LP. The original coding rate may be the coding rate applied to the LP UCI or the coding rate applied to the LP PUCCH resource.

However, there may be a constraint that the LP_UCI_coding_rate is not greater than the HP_UCI_coding_rate.

(6.7) Option 7

The option 7 will be described below. The option 7 will describe a case where a specific parameter applied to the LP UCI (omega_LP) and a specific parameter applied to the HP UCI (omega_HP) are defined separately. The option 7 will illustrate a case where both omega_LP and omega_HP are provided.

The coding rate of the HP UCI (HP_UCI_coding_rate) may be the coding rate obtained by multiplying the original coding rate by omega_HP. The original coding rate may be the coding rate applied to the HP UCI or the coding rate applied to the HP PUCCH resource.

The coding rate of the LP UCI (LP_UCI_coding_rate) may be the coding rate of the original coding rate multiplied by omega_LP. The original coding rate may be the coding rate applied to the LP UCI or the coding rate applied to the LP PUCCH resource.

However, there may be a constraint that the LP_UCI_coding_rate is not greater than the HP_UCI_coding_rate.

(6.8) Option 8

The option 8 will be described below. The option 8 will describe a case where a specific parameter applied to the LP UCI (omega_LP) and a specific parameter applied to the HP UCI (omega_HP) are defined separately. A case where the PUCCH format is one of PUCCH Format 2, PUCCH Format 3 and PUCCH Format 4 will be described here. The option 8 illustrates a case where omega_HP is provided without providing omega_LP.

The coding rate of the HP UCI (HP_UCI_coding_rate) may be the coding rate obtained by multiplying the original coding rate by omega_HP. The original coding rate may be the coding rate applied to the HP UCI or the coding rate applied to the HP PUCCH resource.

The coding rate of the LP UCI (LP_UCI_coding_rate) may be expressed as LP_UCI_coding_rate=min (Upper_bound_LP_UCI_coding_rate, HP_UCI_coding_rate, original coding rate).

Upper_bound_LP_UCI_coding_rate represents the upper coding rate limit for LP UCI, which is calculated based on the total number of Resource Elements (REs) in the PUCCH resource where LP_UCI is multiplexed, HP_UCI_coding_rate, HP UCI payload, and LP UCI payload. The LP UCI payload may be a payload where bits of the LP UCI are not banded or partially dropped, or a payload where bits of the LP UCI are banded or partially dropped. The original coding rate may be the coding rate applied to the LP UCI or the coding rate applied to the LP PUCCH resource.

(6.9) Option 9

The option 9 will be described below. The option 9 will describe a case where a specific parameter applied to the LP UCI (omega_LP) and a specific parameter applied to the HP UCI (omega_HP) are defined separately. A case where the PUCCH format is one of PUCCH Format 2, PUCCH Format 3 and PUCCH Format 4 will be described here. The option 9 illustrates a case where omega_LP is provided without providing omega_HP.

The HP UCI coding rate (HP_UCI_coding_rate) may be the coding rate applied to the HP UCI or the coding rate applied to the HP PUCCH resource. These coding rates may be referred to as the original coding rate.

The coding rate of an LP UCI (LP_UCI_coding_rate) may be expressed as LP_UCI_coding_rate=min (Upper_bound_LP_UCI_coding_rate, omega_LP*original coding rate).

Upper_bound_LP_UCI_coding_rate represents the upper limit of the coding rate of an LP UCI, which is calculated based on the total number of Resource Elements (REs) in the PUCCH resource where the LP_UCI is multiplexed, HP_UCI_coding_rate, HP UCI payload, and LP UCI payload. The LP UCI payload may be a payload where bits of the LP UCI are not banded or partially dropped, or a payload where bits of the LP UCI are banded or partially dropped. The original coding rate may be the coding rate applied to the LP UCI or the coding rate applied to the LP PUCCH resource.

However, there may be a constraint that the LP_UCI_coding_rate is not greater than the HP_UCI_coding_rate.

(6.10) Option 10

The option 10 will be described below. The option 10 will describe a case where a specific parameter applied to the LP UCI (omega_LP) and a specific parameter applied to the HP UCI (omega_HP) are defined separately. A case where the PUCCH format is one of PUCCH Format 2, PUCCH Format 3 and PUCCH Format 4 will be described here. The option 10 illustrates a case where both omega_LP and omega_HP are provided.

The coding rate of the HP UCI (HP_UCI_coding_rate) may be the coding rate of the original coding rate multiplied by omega_HP. The original coding rate may be the coding rate applied to the HP UCI or the coding rate applied to the HP PUCCH resource.

The LP UCI coding rate (LP_UCI_coding_rate) may be expressed by LP_UCI_coding_rate=min (Upper_bound_LP_UCI_coding_rate, omega_LP*original coding rate).

Upper_bound_LP_UCI_coding_rate represents the upper limit of the LP UCI coding rate, which is calculated based on the total number of Resource Elements (REs) in the PUCCH resource where LP_UCI is multiplexed, HP_UCI_coding_rate, HP UCI payload, and LP UCI payload. The LP UCI payload may be a payload where bits of the LP UCI are not banded or partially dropped, or a payload where bits of the LP UCI are banded or partially dropped. The original coding rate may be the coding rate applied to the LP UCI or the coding rate applied to the LP PUCCH resource.

However, there may be a constraint that the LP_UCI_coding_rate is not greater than the HP_UCI_coding_rate.

(7) Other Embodiments

Although the contents of the present invention have been described in accordance with the above embodiments, it is obvious to those skilled in the art that the present invention is not limited to these descriptions but can be modified and improved in various ways.

Although not specifically mentioned in the above disclosure, the application of any of the above options (For example, operation example 1, operation example 2, and each option included in these operation examples) may be set by an upper layer parameter, reported by UE Capability in UE 200, or predetermined in the radio communication system 10. In addition, the application of any of the above options may be determined by an upper layer parameter and UE Capability.

Here, UE Capability may include the following information elements: Specifically, UE Capability may include an information element indicating whether the UE200 supports the multiplex of HP UCI and LP UCI. UE Capability may include an information element indicating whether the UE200 supports the multiplex of HP UCI and LP UCI associated with the first DCI (For example, operation example 1). UE Capability may include an information element indicating whether the UE200 supports the multiplex of HP UCI not associated with the first DCI and LP UCI not associated with the second DCI (the operation example 2-1). UE Capability may include an information element indicating whether the UE200 supports the multiplex of HP UCI not associated with the first DCI and LP UCI associated with the second DCI (the operation example 2-2). UE Capability may include an information element indicating whether the UE200 supports the multiplex of HP UCI and LP UCI using the PUCCH resource set for HP UCI by the information element (For example, PUCCH-ResourceSet(s)) included in the RRC message (For example, PUCCH-Config). The UE Capability may include an information element indicating whether the UE200 is capable of multiplexing HP UCI and LP UCI using a PUCCH resource configured for HP UCI by an information element (For example, SPS-PUCCH-AN-List) included in the RRC message (For example, PUCCH-Config).

In the foregoing disclosure, examples of cases where the first and second priorities are different have been illustrated. However, the foregoing disclosure is not limited thereto. The foregoing disclosure may be applied to cases where the first and second priorities are the same.

The foregoing disclosure exemplifies a case where the first priority is HP and the second priority is LP. However, the foregoing disclosure is not limited thereto. The foregoing disclosure may apply to cases where the first priority is LP and the second priority is HP.

FIG. 4 and FIG. 5 show blocks of functional units. Those functional blocks (structural components) can be realized by a desired combination of at least one of hardware and software. Means for realizing each functional block is not particularly limited. That is, each functional block may be implemented using a single device that is physically or logically coupled, or two or more devices that are physically or logically separated may be directly or indirectly (For example, using wire, wireless, etc.) connected and implemented using these multiple devices. The functional block may be implemented using the single device or the multiple devices combined with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions transmission is called a transmission unit (transmitting unit) or a transmitter. As described above, the method of realization of both is not particularly limited.

Figure 13:
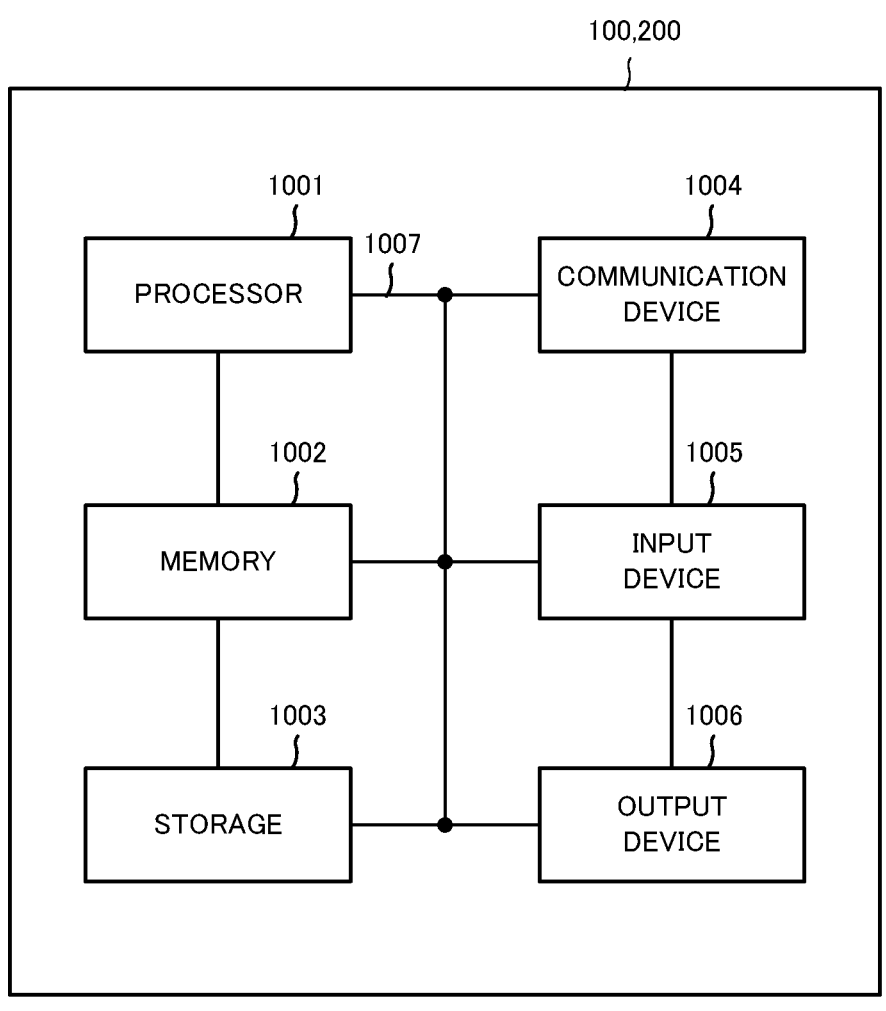
FIG. 13 is a diagram showing an example of a hardware configuration of gNB100 and UE200.

In addition, the above-mentioned gNB100 and UE200 (the device) may function as a computer for processing the radio communication method of the present disclosure. FIG. 13 is a diagram showing an example of a hardware configuration of the device. As shown in FIG. 13, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. The hardware configuration of the device may be configured to include one or more of the devices shown, or may be configured without some of the devices.

Each functional block of the device (see FIG. 4) is implemented by any hardware element of the computer device, or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

Processor 1001, for example, operates an operating system to control the entire computer. Processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. In addition, the various processes described above may be performed by one processor 1001 or may be performed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EE-PROM), Random Access Memory (RAM), and the like. The memory 1002 may be referred to as a register, cache, main memory (main storage device), or the like. The memory 1002 may store a program (program code), a software module, or the like capable of executing a method according to an embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

In addition, the device may be configured to include hardware such as a microprocessor, a digital signal processor (DSP), an application specific integrated circuit (ASIC), a programmable logic device (PLD), a field programmable gate array (FPGA), etc., which may provide some or all of each functional block. For example, the processor 1001 may be implemented by using at least one of these hardware.

The notification of information is not limited to the aspects/embodiments described in the present disclosure and may be carried out using other methods. For example, the notification of information may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals, or a combination thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing steps, sequences, flowcharts, etc., of each of the embodiments/embodiments described in the present disclosure may be reordered as long as there is no conflict. For example, the method described in the present disclosure presents elements of various steps using an exemplary sequence and is not limited to the particular sequence presented.

The specific operation that is performed by the base station in the present disclosure may be performed by its upper node in some cases. It is apparent that in a network consisting of one or more network nodes having a base station, various operations performed for communication with a terminal may be performed by at least one of the base station and other network nodes (Examples include, but are not limited to, MME or S-GW.) other than the base station. In the above, an example in which there is one network node other than the base station is explained; however, a combination of a plurality of other network nodes (for example, MME and S-GW) may be used.

Information, signals (information, etc.) may be output from a higher layer (or lower layer) to a lower layer (or higher layer). It may be input and output via a plurality of network nodes.

The input/output information can be stored in a specific location (for example, a memory) or can be managed in a management table. The input and output information may be overwritten, updated, or added. The information can be deleted after outputting. The inputted information can be transmitted to another device.

The determination may be based on a value represented by a single bit (0 or 1), a true or false value (Boolean: true or false), or a numerical comparison (For example, comparison with a given value).

Each of the aspects/embodiments described in the present disclosure may be used alone, in combination, or alternatively in execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if software is transmitted from a website, server, or other remote source using at least one of wired technology (Coaxial, fiber-optic, twisted-pair, and digital subscriber lines (DSL)) and wireless technology (Infrared, microwave, etc.), at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltage, current, electromagnetic waves, magnetic fields or magnetic particles, optical fields or photons, or any combination thereof.

The terms described in the present disclosure and those necessary for understanding the present disclosure may be replaced with terms having the same or similar meanings. For example, at least one of a channel and a symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station may contain one or more (For example, three) cells, also called sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a base station performing communication services in this coverage and to a portion or the entire coverage area of at least one of the base station subsystems.

In the present disclosure, the terms "mobile station (Mobile Station: MS)," "user terminal," "user equipment (User Equipment: UE)," "terminal" and the like can be used interchangeably.

A mobile station may also be referred to by one of ordinary skill in the art as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other appropriate term.

At least one of a base station and a mobile station may be called a transmitting device, a receiving device, a communication device, or the e like. Note that, at least one of a base station and a mobile station may be a device mounted on a moving body, a moving body itself, or the like. The mobile may be a vehicle (For example, cars, planes, etc.), an unmanned mobile (For example, drones, self-driving cars,), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, terms an uplink channel, a downlink channel, or the like may be read as a side channel.

Similarly, the mobile station in the present disclosure may be replaced with a base station. In this case, the base station may have the function of the mobile stat ion.

The radio frame may be composed of one or more frames in the time te domain. Each frame or frames in the time domain may be called a subframe.

The subframes may also be composed of one or more slots in the time domain. The subframes may be of a fixed time length (For example, 1 ms) independent of numerology.

The numerology may be a communication parameter applied to at least one of the transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may consist of one or more symbols (Orthogonal Frequency Division Multiplexing (OFDM)) symbols, Single Carrier Frequency Division Multiple Access (SC-FDMA) symbols, etc., in tin the time domain. A slot may be a unit of time based on the numerology.

A slot may include a plurality of minislots. Each minislot may consist of one or more symbols in the time domain. A minislot may also be called a subslot. A minislot may be composed of fewer symbols than slots. The PDSCH (or PUSCH) transmitted in time units greater than the minislot may be referred to as the PDSCH (or PUSCH) mapping type A. The PDSCH (or PUSCH) transmitted using the minislot may be referred to as the PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as the transmission time interval (TTI), multiple consecutive subframes may be referred to as the TTI, and one slot or minislot may be referred to as the TTI. That is, at least one of the subframes and the TTI may be a subframe in the existing LTE (1 ms), a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called a TTI, one or more TTIs (That is, one or more slots or one or more minislots) may be the minimum time unit for scheduling. The number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTIs shorter than the normal TTI may be called shortened TTI, short TTI, partial or fractional TTI, shortened subframe, short subframe, minislot, subslot, slot, etc.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a resource allocation unit in the time and frequency domains and may include one or more consecutive subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI in length. The one TTI, one subframe, and the like may each consist of one or more resource blocks.

The one or more RBs may be called physical resource blocks (PRBs), sub-carrier groups (SCGs), resource element groups (REGs), PRB pairs, RB pairs, and the like.

The resource blocks may be composed of one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB relative to the common reference point of the carrier. PRB may be defined in BWP and numbered within that BWP.

BWP may include UL BWP (UL BWP) and DL BWP (DL BWP). For the UE, one or more BWPs may be set in one carrier.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in the radio frame, the number of slots per subframe or radio frame, the number of minislots included in the slot, the number of symbols and RBs included in the slot or minislot, the number of subcarriers included in the RB, and the number of symbols in the TTI, the symbol length, the cyclic prefix (CP) length, and the like can be varied.

The terms "connected" and "coupled," or any variation thereof, mean any direct or indirect connection or coupling between two or more elements, and can include the presence of one or more intermediate elements between two elements "connected" or "coupled" to each other. The connection or coupling between elements may be physical, logical, or a combination thereof. For example, "connection" may be read as "access." As used in the present disclosure, two elements may be considered to be "connected" or "coupled" to each other using at least one of one or more wire, cable, and printed electrical connections and, as some non-limiting and non-inclusive examples, electromagnetic energy having wavelengths in the radio frequency, microwave, and optical (both visible and invisible) domains.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to elements using designations such as "first" and "second" as used in this disclosure does not generally limit the quantity or order of those elements. Such designations can be used in the present disclosure as a convenient way to distinguish between two or more elements. Accordingly, references to first and second elements do not mean that only two elements may be employed therein, or that the first element must in any way precede the second element.

In the present disclosure, the used terms "include," "including," and variants thereof are intended to be inclusive in a manner similar to the term "comprising." Furthermore, it is intended that the term "or (or)" as used in the present disclosure is not an exclusive OR.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
110 Reception unit
120 Transmission unit
130 Control unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus

The invention claimed is:

1. A terminal comprising:
   a processor that multiplexes a first uplink control information of a first priority and a second uplink control information of a second priority; and
   a transmitter that transmits the first uplink control information and the second uplink control information via same uplink control channel,
   wherein the processor determines a resource of the same uplink control channel based on most recent first downlink control information among a plurality of a first downlink control information associated with the first uplink control information,
   wherein the processor determines a resource of the same uplink control channel from a resource set as a resource different from a resource that can be indicated by the first downlink control information when there is no first downlink control information associated with the first uplink control information, and
   wherein the resource set as a different resource is a resource set by SPS-PUCCH-AN-List included in an RRC message.

2. The terminal of claim 1, wherein
the processor determines a resource specified by an identifier contained in the most recent first downlink control information from among resources in a resource set associated with the first uplink control information as a resource of the same uplink control channel.

3. A radio communication system comprising:
a terminal; and
a base station, wherein
the terminal comprises:
   a processor that multiplexes a first uplink control information of a first priority and a second uplink control information of a second priority; and
   a transmitter that transmits the first uplink control information and the second uplink control information via same uplink control channel,
   wherein the processor determines a resource of the same uplink control channel based on most recent first downlink control information among a plurality of a first downlink control information associated with the first uplink control information,
   wherein the processor determines a resource of the same uplink control channel from a resource set as a resource different from a resource that can be indicated by the first downlink control information when there is no first downlink control information associated with the first uplink control information, and
   wherein the resource set as a different resource is a resource set by SPS-PUCCH-AN-List included in an RRC message.

4. A radio communication method comprising:
multiplexing a first uplink control information of a first priority and a second uplink control information of a second priority;
transmitting the first uplink control information and the second uplink control information via same uplink control channel; and
determining a resource of the same uplink control channel based on most recent first downlink control information among a plurality of a first downlink control information associated with the first uplink control information,
   wherein the method further comprises determining a resource of the same uplink control channel from a resource set as a resource different from a resource that can be indicated by the first downlink control information when there is no first downlink control information associated with the first uplink control information, and
   wherein the resource set as a different resource is a resource set by SPS-PUCCH-AN-List included in an RRC message.

* * * * *